April 19, 1932. E. B. WHELAN 1,855,121
COMBINED CIRCULATING AND BY-PASS VALVE
Filed May 14, 1928 4 Sheets-Sheet 1
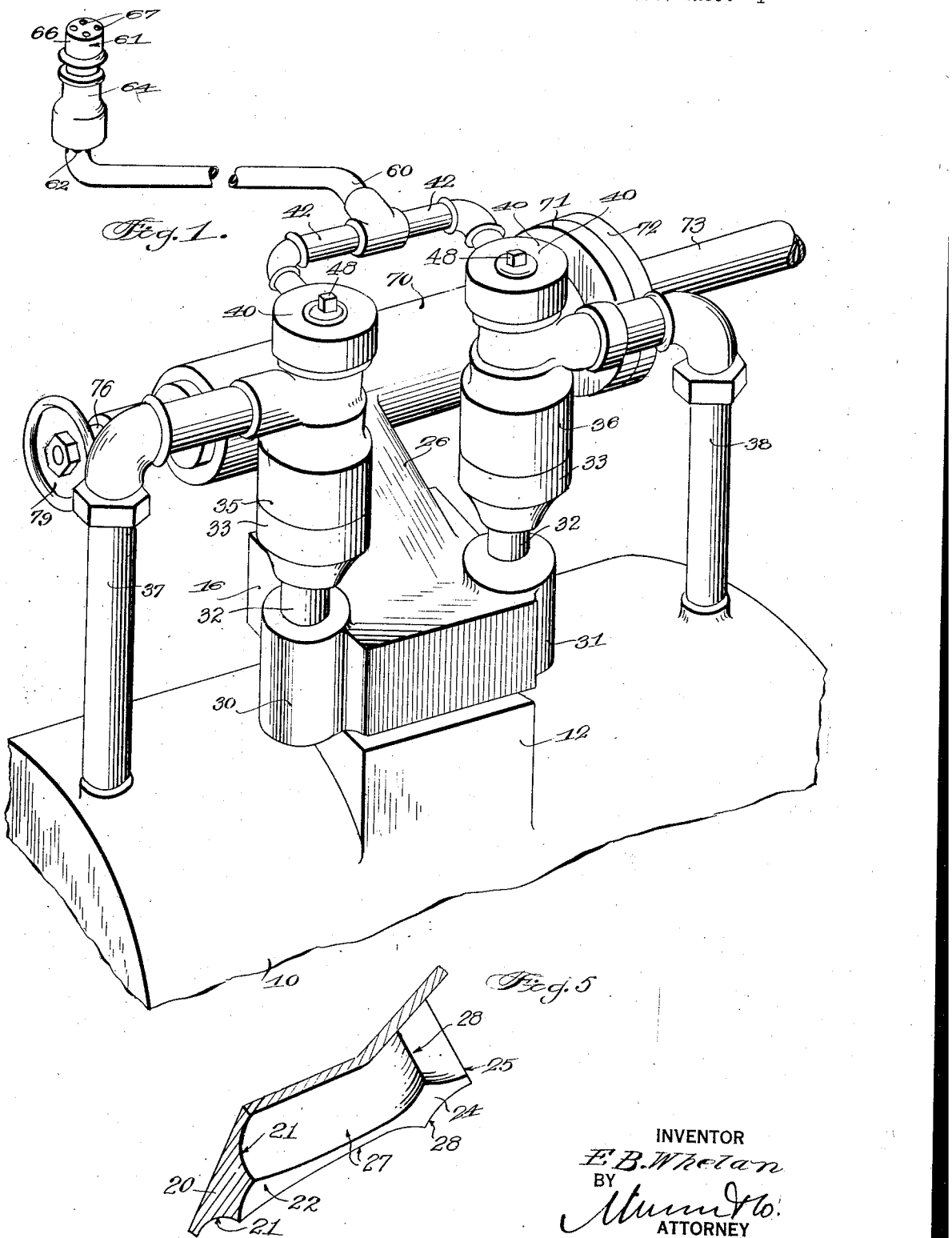

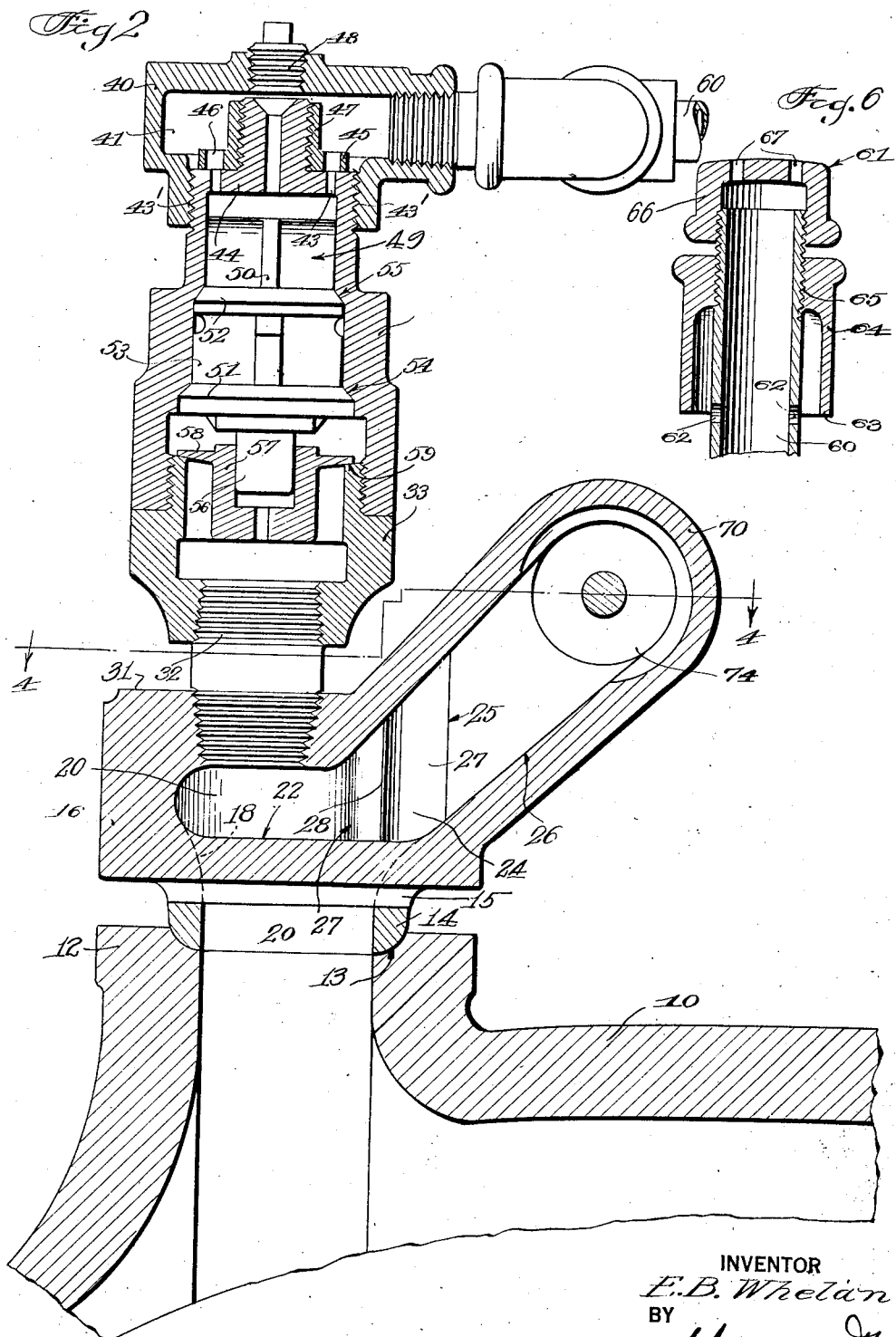

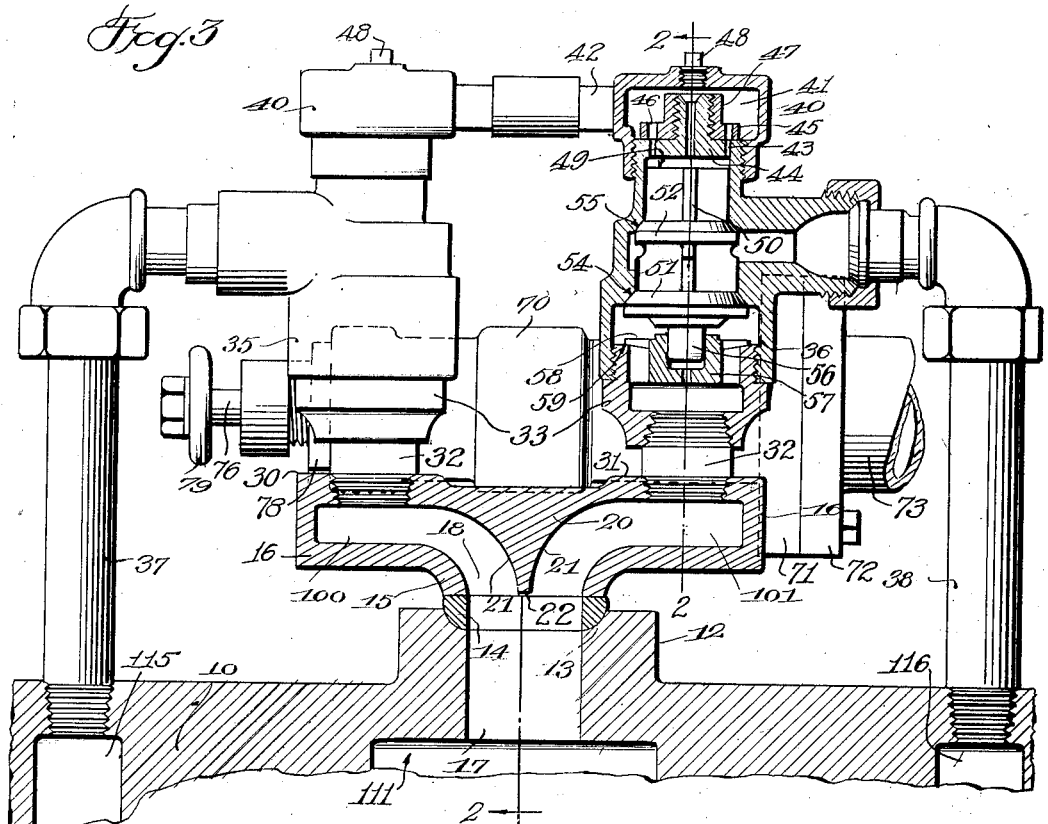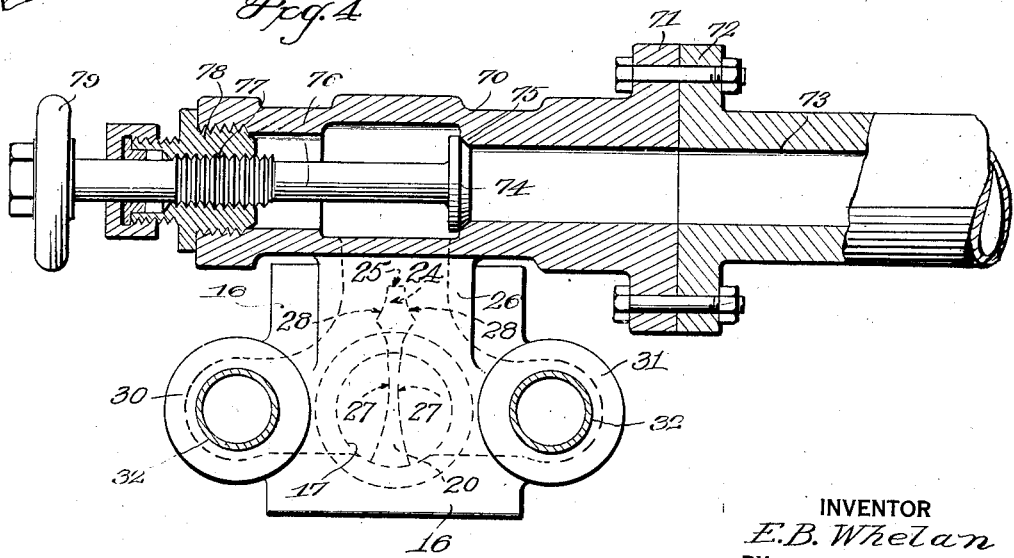

April 19, 1932.   E. B. WHELAN   1,855,121
COMBINED CIRCULATING AND BY-PASS VALVE
Filed May 14, 1928    4 Sheets-Sheet 4

INVENTOR
E. B. Whelan
BY
ATTORNEY

Patented Apr. 19, 1932

1,855,121

UNITED STATES PATENT OFFICE

EUGENE B. WHELAN, OF CHICAGO, ILLINOIS

COMBINED CIRCULATING AND BY-PASS VALVE

Application filed May 14, 1928. Serial No. 277,543.

This invention relates to a combined circulating and by-pass valve for locomotives, and more particularly to that type of valve described and claimed in my Patent #1,502,283, dated July 22, 1924.

An object of the invention is to provide a mechanism primarily intended for use in connection with steam locomotives, but adaptable to steam engines of other types, for the specific purpose of insuring the equalized distribution of the lubricant to the piston valves and allied parts during drifting of the locomotive during which time vapors of extremely low pressure (virtually atmospheric) must be relied upon to carry suspended lubricant to the foregoing bearing parts in lieu of the then absent high pressure steam which exercised the function while the locomotive was working under pressure.

A further object of the invention is to accomplish the foregoing purpose by use of a baffle in connection with certain vapor receiver which is coupled with the steam chest of the locomotive, the operation of this baffle being to compel the vapors to follow a definite direction to both ends of an engine cylinder and particularly into the bushings of the piston valve in the steam chest, thus to insure an equalized lubrication of said bushings while the engine is drifting.

A further object of the invention is to indirectly employ said baffle in connection with the conventional booster of a locomotive, to which end the baffle serves to direct certain residual volumes of vapor left in the booster pipe after closing the engine throttle to the booster, in equal volumes to the relief valves, to the piston valve and to the ends of the respective engine cylinder.

A still further object of the invention is to employ, when drifting, the residual volume of vapor remaining in the circulation system consisting of the engine cylinder and its connected passageways and valves, as the vehicle for keeping in suspension particles of carbon which would otherwise settle in the circulation system to the detriment of lubrication.

A still further object of the invention is the provision of a cap-casing in connection with a by-pass valve of a locomotive and including means for increasing the sounds emanating from the cylinders of the engine whereby it is possible for the engineer to determine whether or not he has placed the reverse lever in the proper position for drifting.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a view in perspective of a by-pass valve constructed according to the principles of my invention, Figure 2 is a vertical section taken substantially along the line 2—2 of Figure 3, Figure 3 is a view in elevation of the device and partly in section.

Figure 4 is a horizontal section taken along the line 4—4 of Fig. 2,

Figure 5 is a sectional perspective view of a baffle used in connection with the arrangement in Fig. 4.

Figure 6 is a vertical section of a sound magnifying device.

Figure 7:
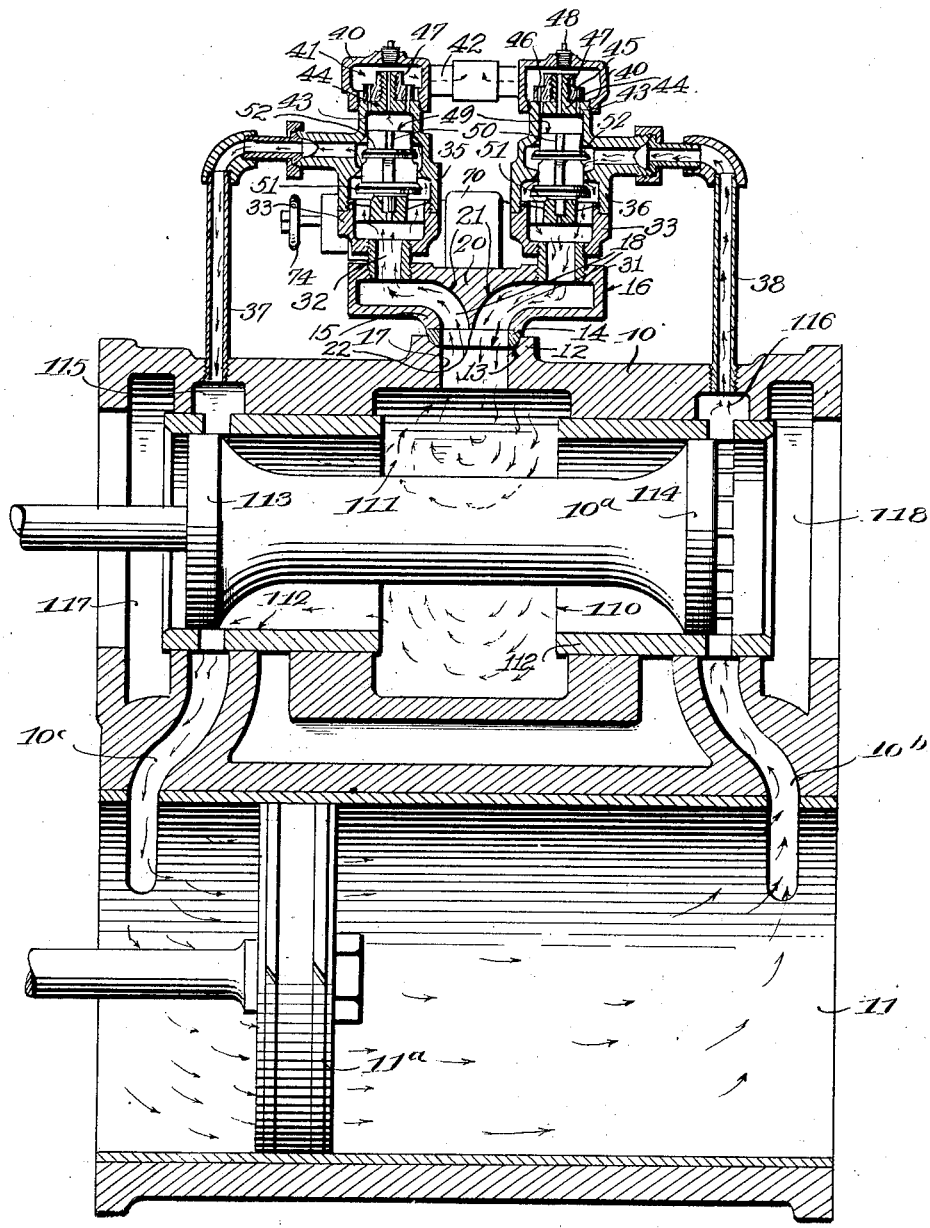
Fig. 7 is a vertical section of an engine cylinder and steam chest assemblage, especially illustrating the combination therewith of the receiver and its baffle.

Referring more particularly to the drawings 10 designates a steam chest of a locomotive of well known construction which is connected with a cylinder 11 in which operates a piston 11a. The steam chest 10 has a piston valve 10a of the inside admission type (Fig. 7), which controls the supply of steam through ports 10b and 10c to the opposite ends of the cylinder when the locomotive is operated under pressure, and according to the usual manner. The chest is provided with a boss 12 having a seat 13 to receive a joint ring 14 which is engaged by a boss 15 on a receiver 16. The boss 12 has a passage 17 aligning with a passage 18 in the boss 15 for placing the receiver 16 in communication with the steam chest 10.

The receiver 16 is provided with an integrally formed baffle 20 having oppositely curved faces 21 with the baffle terminating at 22 in the passage 18 of the boss 15. The baffle 20 extends longitudinally and centrally of the receiver (Fig. 4). The leading end 24 (Fig. 4) of the baffle is wedge shaped and presents a vertical edge 25 towards a conduit 26 thus providing what is aptly termed a "split." The split performs its function after a closing of the engine throttle valve with respect to the conventional booster (not shown). It then serves to equally distribute the residual volume of vapor to both ends of the piston valve 10ª as well as to certain relief valves and to the opposite ends of the respective engine cylinder. The sides of this portion of the leading end 24 are curved outwardly, as shown at 28 and then inwardly as illustrated at 27.

A pair of hollow bosses 30 and 31 are formed integrally with the receiver 16 and into each of these is threaded a connection 32. A nut 33 is threaded into each of a pair of valve bodies 35, 36, each connection 32 being threaded into its respective notches.

The casing 35 is connected by means of a pipe 37 with the steam chest 10 upon one side of the housing 16, while a pipe 38 connects the casing 36 with the chest 10 on the opposite side of the housing 16.

A cap-casing 40 is threaded onto each valve casing 35 and 36 and is provided with a chamber 41 which is in communication with a pipe 42. The cap is threaded at 43' onto the upper end of the valve casing. The upper end of each casing 35, 36 (Fig. 2) is provided with a closure 44 having passages 43 and connecting the casings 35 and 36 with the respective chamber 41. A disc 45 is provided with passages 46 adapted to align with the passages 43. Said disc is connected to a sleeve 47 which may be adjusted for controlling the flow of fluid through the passages 43. A plug 48 is threaded into each cap 40 and is adapted to be removed to permit inspection of sleeve 47 and to determine the adjustment of the sleeve 47. The plug may be revolved in any appropriate manner for operating the sleeve 47 and likewise the disc 45. A valve 49 winged at 50 is adapted to be actuated in a manner which will be presently explained.

A pair of valve elements 51 and 52 are formed by a web 53, these elements constituting an integral part of the valve member 49 of which one is mounted in each of the valve casings 35 and 36. The valve 51 is adapted to engage a seat 54 while valve 52 engages a seat 55. Guidance of the valve member 49 is assisted by means of a stem 56 slidably mounted in a guide 57 which is rested at 58 upon a shoulder 59 of the nut 33.

The pair of pipes 42 extending from the caps 40 lead into a common conduit 60 which is connected with a sound magnifying device indicated generally by the numeral 61 (Fig. 1). The outer end of the conduit 60 as shown in Fig. 6 is provided with a pair of radial passages 62 which are opposite the free end 63 of an apron 64 threaded at 65 upon the pipe 60. A cap 66 is threaded onto the outer free end of the pipe 60 and is provided with passages 67 to permit the escape of vapor. Means may be employed for varying the passages 67 or the passages may be bored to the proper size of diameter to fit the needs of a particular locomotive.

The sound magnifying device 61 acts as a discharge valve. It permits the intake of air from the atmosphere for breaking the vacuum and to relieve compression when the locomotive is drifting.

The conduit 26 is formed integrally with a horizontal valve casing 70 having a flange 71 at its outer end to which may be connected a flange 72 of a pipe 73 leading elsewhere in the locomotive mechanism. Vapor flowing into the casing 70 from the pipe 73 is controlled by means of a valve 74 engaging a seat 75. A stem 76 is threaded at 77 into a gland 78 in turn threaded into one end of the casing 70. A handle 79 is formed on the outer projecting end of the stem for controlling the position of the valve 74. It will be noted that the inner end 25 of the baffle 20 is located adjacent the communication between the conduit 26 and the valve casing 70.

Revert to the steam chest 10. The previously mentioned communication of the receiver 16 occurs with a center chamber 111 to which steam would be admitted if the locomotive were operating under pressure. The place or means of admission of the steam are not illustrated because the present disclosure is predicated on the dissemination of the vapors during the drifting of the locomotive. Moreover, the invention is predicated on a total cutting off of the steam at the throttle valve during drifting, it being the specific intention to avoid the requirement of "cracking" the throttle valve as a necessary concomitant to drifting according to prevailing practice.

The center chamber 111 is open at 110 to a pair of ported bushings 112 in which the heads 113, 114 of the piston valve 10ª have slidable bearing. Annular chambers 115, 116 are in perpetual communication with the ports of the bushings 112, but the amount of openings of the ports is controlled by the heads 113, 114. It is through these ports that the chambers 115, 116 are provided communication with the exhaust passages 117, 118.

The operation is readily understood. By way of preface it may be stated that steam is admitted at the center chamber 111 when the locomotive is operated under pressure, this steam being directed first to one end then the other of the engine cylinder 11, thus to cause reciprocation of the piston 11ᵃ according to common custom. The disclosure is concerned solely with the drifting of the locomotive, at which time no live steam whatsoever is intentionally admitted to the center chamber 111.

According to prevailing practice lubricating oil is forced into the engine cylinder 11, where it is picked up and disseminated through the steam under pressure, hence carried into the bushings 112 where it supplies adequate lubrication for the heads 113, 114 of the piston valve 10ᵃ. The invention is concerned solely with the lubrication of these heads 113, 114 when the steam pressure has been cut off at which time the lubrication of the heads 113, 114 would be very imperfectly carried on.

A volume of vapor remains in the engine cylinder 11 and its connected passageways upon closure of the throttle, although it must be understood that the supply of lubricant to the cylinder 11 has not been cut off. It is this vapor that is converted into a vehicle for carrying on the effective lubrication of the heads 113, 114, and to this end the curved contour of the baffle 20 serves to direct the vapor downwardly into the chamber 111 with a long sweeping stroke which causes the vapor not only to fill the chamber 111 but to also become distributed thoroughly in the bushings 112 so that the exposed surfaces are left with a deposit of oil prior to the egress of the vapors on the retreating side of the baffle and into the adjacent side of the cylinder 11.

When it is desired to drift the locomotive, grade conditions permitting, or to decrease the velocity of the locomotive, the reverse lever (not shown), by which the travel settings of the piston valve 10ᵃ are regulated will be adjusted to one-third or one-half stroke cut off. The main throttle valve is firmly closed. No steam is used when drifting, and drifting should be resorted to as much as possible. The foregoing one-third to one-half stroke cut is utilized when drifting and this can be intermediately adjusted to a precise position of the reverse lever.

The engineer should observe if vapor is noticeable at the sound amplifying device 61 (Fig. 1) on either side of the locomotive. If vapor is noticeable, the reverse lever should be moved forward a notch or two and if vapor is still observed the reverse lever should be adjusted a few notches back, thereby shortening the valve cut off to a precise drifting position of the reverse lever. From this it will be understood that the bushing ports will be so nearly covered by the heads 113, 114 that in the case of the head 114 there will be no appreciable escape of the vapors from the compression end of the cylinder 11 into the exhaust passage 118, consequently the major volume of vapors will be conducted to the pipe 38 (Fig. 7), hence through the by-pass valve body 36 and into the receiver 16 as already stated. Under the same condition, there will be a sufficient uncovering of the ports beneath the head 113 to break the vacuum in the left end of the engine cylinder 11.

When the condition of the piston 11ᵃ is reversed, the foregoing condition will be reversed. It is thus easy to see that the vapor streams from the ends of the engine cylinder 11 are directed in alternately opposite directions toward the receiver 16 (Fig. 7), and it is due to the fact that the baffle 20 virtually splits the passage 17 that these alternating currents of vapor are directed into the chamber 111 to the remote side thereof for circulation in the bushings 112 in substantially equal volumes. The free circulation of the vapors is in no way impeded by the by-pass valves because the valve members 49 work in unison in gravitating to the open positions (Fig. 7) upon the closing of the engine throttle. The vapor circulated by the idling piston 11ᵃ is not under enough pressure to raise the valve member 49 on the outgoing side, for instance the valve member on the left (Fig. 7), assuming the piston 11ᵃ to be travelling toward the right.

Sometimes the engine throttle valve will get into an undesirably leaky condition so that live steam, even though of low pressure, will reach the center chamber 111. Assuming the locomotive to be drifting, the action would be as follows: Both by-pass valves 35, 36 (Fig. 7) are assumed to be open. With the piston 11ᵃ travelling to the right, the tendency toward a vacuum in the left end of the engine cylinder will draw some of the leaking steam through the valve 35 and into the left end of the engine cylinder 11. On the reverse motion of the piston 11ᵃ some of the leaking steam will be drawn into the right end of the cylinder 111. The purpose of the baffle 20 is to direct these volumes of steam first to the left and then to the right so that equal volumes are administered to the left and right ends of the engine cylinder, later to be transferred as equal volumes of oil-laden vapor into the left and right bushings 112.

Assuming the locomotive to be stopped, and the throttle still leaky, the action will be as follows: It will be remembered that the by-pass valves 35, 36 (Fig. 7) are still open. Steam leakage is present in the center chamber 111 and is bound to find its way through the open by-pass valves 35, 36. The baffle 20 now performs the important function of directing equal volumes of steam into the pipes 37, 38, thence into the left and right ends of the engine cylinder 11, thus blocking the piston 11ª. This is a safety feature, augmenting the customary equipment of brakes. The fact that the baffle directs substantially equal volumes of leaking steam through the valve bodies 35, 36 means that the bearings of the valve members 49 will be uniformly lubricated with such oil as has been picked up in the steam chest.

Consider the sound amplifying device 61. Mention has been made of the discharge of vapor at this device and the indication that is thus afforded after any necessary readjustment of the reverse lever. It is of course possible to seen the vapor should any be discharged, but inasmuch as vapor cannot be seen at night sole reliance must be put on the sound.

In modern locomotives the steam chest is so far away from the engine cab that the ordinary sound of discharging vapor under slight compression will not be audible. For that reason the sound amplifying device 61 must be used. An incidental use of the off-take pipe 60 having at the end thereof a sound amplifying device 61 is to carry any discharging vapor of an objectionable odor to a point high enough over the boiler where it will escape the engineer.

The sound emitted at the device 61 when the locomotive is drifting is that of the compressed vapor which passes the valve members 49 (Fig. 7) and discharges into the cap-casing 40. The nature of the sound will be a sure indication to the engineer whether or not he has set the reverse lever in the correct position whereby the piston valve 10ª will perform its function to best advantage. It will be but a minor flow of vapor that escapes into the cap-casing 40, the major flow being into the receiver 16, thence into the steam chest 10 for the purpose already described.

It will be understood that in every instance vapor is put to good use by the piston 11ª during drifting to carry lubricant from the engine cylinder 11 to the bearing parts of the piston valve 10ª as well as to the bearings of the valve members 49.

An important function of the locally circulated vapor volume is the keeping in suspension of the particles of carbon caused by the sedimentation of the lubricating oil. Were it not for the provision of flowing the vapor alternately into the ends of the engine cylinder 11 there would be the possibility of such carbon accumulating in dangerous proportions both in the engine cylinder 11 and in all parts of the circulation system. The accumulating carbon particles are simply swept back and forth but always remain loose while the locomotive is drifting, and when pressure steam is again admitted to the center chamber 111 the oily vapor is disseminated and eliminated through the exhaust cavities, exhaust nozzle and stack.

I claim:—

1. In a device of the character described, a steam chest of a locomotive, a receiver having an opening for placing the receiver in communication with the chest, branch pipes connecting opposite ends of the chest with the receiver, a baffle extending across the opening for directing fluids from the chest in opposite directions, so that lubricant and particles of carbon carried by the steam are evenly distributed throughout the path of the steam.

2. In a device of the character described, a steam chest of a locomotive, a receiver having an opening for placing the receiver in communication with the chest, branch pipes connecting opposite ends of the chest with the receiver, a baffle depending from the top of the receiver and diametrically across the opening separating the receiver into two chambers, said baffle adapted to aid in the even distribution of lubricant and particles of carbon carried by the steam throughout its path.

3. In a device of the character described, a steam chest of a locomotive, a receiver having an opening for placing the receiver in communication with the chest, branch pipes connecting opposite ends of the chest with the receiver, a baffle located intermediate the ends of the receiver and having its lower edge across the opening in the receiver for dividing said receiver into two chamber, one of the chambers being in open communication with one of the branch pipes, the other chamber being in open communication with the other branch pipe, said baffle adapted to aid in the even distribution of lubricant and particles of carbon carried by the steam throughout its path.

4. In a device of the character described, a steam chest of a locomotive, a receiver having an opening for placing the receiver in communication with the chest, branch pipes connecting opposite ends of the chest with the receiver, a baffle separating the receiver into two chambers, one of the chambers being in communication with one of the branch pipes, the other chamber being in communication with the other branch pipe, said branch pipes being in communication with each other through the receiver in that portion of the receiver which is below the lower edge of the baffle, said baffle adapted to aid in the even distribution of lubricant and particles of carbon carried by the steam throughout its path.

5. In a device of the character described comprising a steam chest of a locomotive, a receiver having an opening for placing the said receiver in communication with the chest, a conduit in open communication with the receiver, a baffle located in the receiver and projecting into the conduit, said baffle dividing the receiver into a plurality of chambers and having a portion extending diametrically across the opening, said baffle being adapted to direct vapor moving in opposite directions through the receiver while aiding in the proper distribution of lubricant carried by the vapor.

6. In a device of the character described comprising a steam chest of a locomotive, a receiver having an opening for placing the said housing in communication with the chest, a conduit in open communication with the receiver, a baffle located in the receiver and projecting into the conduit, said baffle being continued across the receiver and having the lower edge thereof located diametrically across the opening, said baffle being adapted to direct vapor moving in opposite directions through the receiver while aiding in the proper distribution of lubricant carried by the vapor.

7. In a locomotive, an inside admission piston valve, ported bushings in which said valve is slidable, a steam chest containing the bushings, said steam chest having annular chambers in communication with the bushing ports, through which annular chambers vapor streams are directed in alternately opposite directions when the locomotive is drifting, a receiver and passage in communication with the center chamber, means establishing communication of the annular chambers with said receiver when the locomotive is drifting, and a baffle in the receiver having curved components converging toward the passage to virtually split the passage and direct the alternating vapor streams to the remote side of the center chamber for direction into and circulation in the bushings to deposit suspended oil.

8. In a locomotive, an inside admission piston valve, ported bushings in which said valve is slidable, an engine cylinder having a piston, a steam chest having a center chamber open to the bushings for supplying steam thereto when the engine is operated under pressure, said steam chest having annular chambers in communication with the bushing ports and with the ends of the cylinder to which the steam is alternately directed by the operation of the slide valve, a receiver having a passage in communication with the center chamber, means establishing communication of the annular chambers with the receiver when the locomotive is drifting, thus supplying the receiver with volumes of vapor laden with oil from the cylinder and flowing in alternately opposite streams by action of the idling piston, and a baffle having sides curved toward said passage, virtually splitting the passage and introducing the flow of oil-laden vapor to the remote side of the center chamber for direction into and circulation in the bushings to lubricate the slide valve during drifting.

9. In a locomotive, an engine cylinder having steam ports adjacent to its ends and a piston setting up opposite flows of vapor in said ports while the locomotive is drifting, the pressure on the advancing side of the piston being slightly above atmosphere and the pressure on the receiving side being slightly below atmosphere, a steam chest having a piston valve controlling the admission of steam to said ports when the locomotive is working under pressure, a pair of valve bodies each connected at one end with the respective ports, valve members in said bodies assuming open positions during drifting of the locomotive for the establishment of communication of the pressure side of the engine cylinder with the vacuum side, a receiver with which the other ends of the valve bodies connect, said receiver also being in communication with the steam chest, and a baffle in the receiver located medially of the points of connection of said valve bodies, deflecting the pressure flow from one of the valve bodies into the steam chest prior to departure through the other valve body to the vacuum side of the engine cylinder, thereby equalizing the engine cylinder vapor pressures and preventing the siphoning of oil from the steam chest.

EUGENE B. WHELAN.